Nov. 24, 1970   E. V. NAYBOR   3,543,202
MAGNETIC LATCHING INDICATOR MECHANISM
Filed Oct. 12, 1967
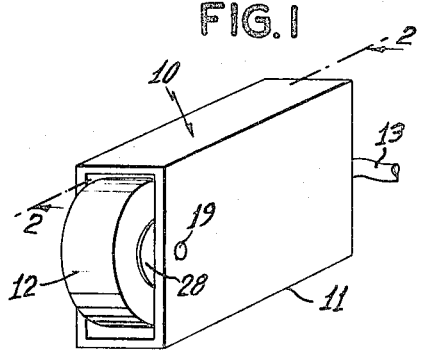
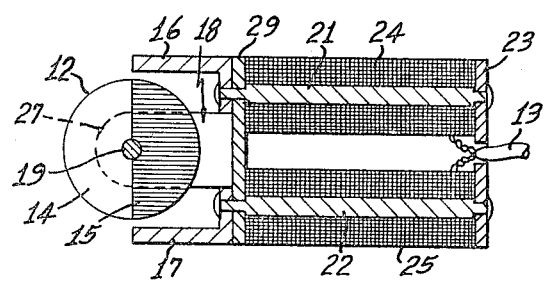
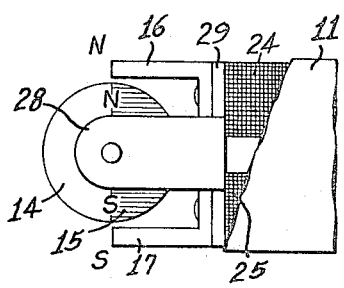
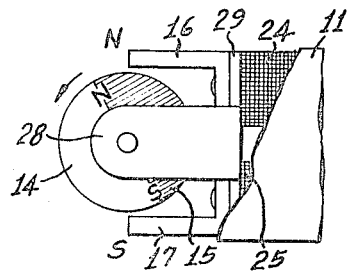
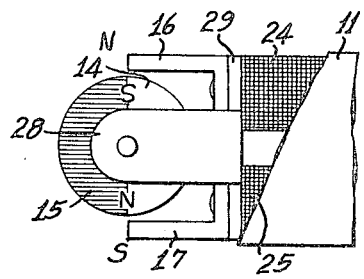
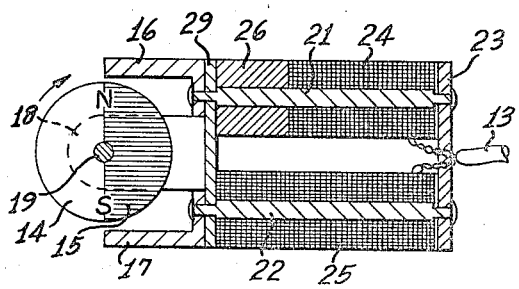
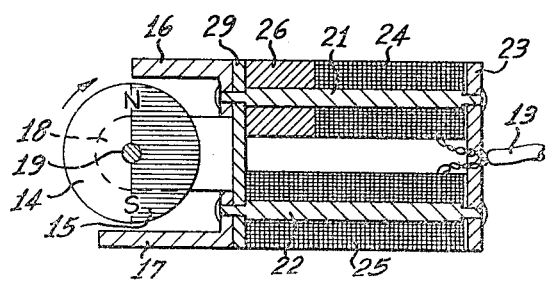
INVENTOR.
Edward V. Naybor
BY
McGregor & Eisenman
ATTORNEYS

United States Patent Office 3,543,202
Patented Nov. 24, 1970

---

3,543,202
MAGNETIC LATCHING INDICATOR MECHANISM
Edward V. Naybor, Port Washington, N.Y., assignor to E. V. Naybor Laboratories, Inc., Port Washington, N.Y., a corporation of New York
Filed Oct. 12, 1967, Ser. No. 674,809
Int. Cl. H01f 7/08
U.S. Cl. 335—229                    11 Claims

ABSTRACT OF THE DISCLOSURE

An indicator mechanism responsive to short duration direct current pulses to discretely indicate the nature of the last pulse applied. This indicator is magnetically latched in position and maintains the last position achieved irrespective of possible power failure.

THE BACKGROUND OF THE INVENTION

Indicators of the type herein contemplated find application in a number of ways. They may be described as being of the bistable type wherein a visual indicator unit presents one of two possible aspects, depending upon the nature of the control signals applied. Such indicators have been used in arrays in order to develop controllable geometric patterns and they have also been used individually as pilot lights, stop-go indicators, and fault indicators.

The prior art has demonstrated that these indicators can be developed by the utilization of an electromagnet acting upon a permanent magnet rotor. The electromagnet member is in turn selectively energized by direct current. In the prior structure, the electromagnet is formed on a U-shaped core and the permanent magnet rotor is mounted within the legs of the core in such a way that the magnetic flux of the respective magnets interacts to establish a preferred relative position. Thus, as the electromagnet is energized with either a first or second polarity, the poles of the rotatable permanent magnet are either attracted or repelled and it is forced to a position of stability whereat its poles are proximate to the opposing poles of the electromagnet. If the applied voltage creates an electromagnetic field opposing that of the permanent magnet, the repulsion of the poles will cause the rotor to turn until the opposing poles can effect a magnetic latching; after which, the rotor is held in position.

A problem in developing a simple indicating structure resides in the fact that in the optimum magnetically latched position, the opposing poles are in direct confrontation. This makes switching difficult because when the electromagnet polarity is reversed to actuate the mechanism, the force of the opposing poles is directed along a line through the axis of the rotor and no torque is applied.

The technique employed in the above-mentioned prior art indicator compromises with optimum latching by providing an initial offset position of the rotor. To do this, stop members are mounted on the rotor to hold it approximately 20° off center when magnetically latched. Where such stop members are used, the rotor cannot rotate in both directions; and if it is viewed directly, the viewing area is limited because travel of the rotor between positions is less than 180°. Where the unit is switched often, continuous restricted rotation also creates uneven frictional wear on the bearings supporting the rotor. In addition, stop members introduce mechanical shock on the unit each time the rotor strikes the stop upon assuming a new position; and when the unit is subjected to vibration there will be considerable mechanical wear.

It is an object of the present invention to provide a bistable indicator mechanism utilizing a rotating armature capable of visually presenting discrete areas of 180°.

Another object of the invention is to provide a bistable indicator mechanism with a freely rotatable permanent magnet armature which magnetically latches into either of two 180° spaced apart positions.

Another object of the present invention is to provide a bistable indicating mechanism suitable for use in high vibration environments, such as when mounted in aircraft or missiles.

Still another object of the present invention is to provide an improved bistable indicator mechanism responsive to direct current pulses ranging in duration from 15 milliseconds upward.

Still another object of the invention is to provide an indicator mechanism well adapted to miniaturization and ease of manufacture.

SUMMARY OF THE INVENTION

In accordance with the invention there is provided an indicator mechanism responsive to direct current which comprises a substantially U-shaped core, and a permanent magnetic armature rotatable in a plane containing the legs of said core about an axis between said legs. A number of embodiments of the invention illustrate unique structures for electromagnetically producing a magnetic flux of opposite polarity and unequal density emanating from each of the legs of the core. This flux co-acts with the magnetic field of the permanent magnet armature to effect rotation thereof and the subsequent establishment of one of two discrete positions.

BRIEF DESCRIPTION OF THE DRAWING

FIG. 1 is a perspective illustration of the magnetic latching indicator of this invention;

FIG. 2 is a cross-section taken along lines 2—2 of FIG. 1, with the cover removed, schematically illustrating one embodiment of the invention;

FIGS. 3A, 3B and 3C are schematic illustrations, with the cover partially broken away, showing the embodiment of FIG. 2, and providing a visual demonstration of the position of the rotor as it is rotated upon application of an input signal;

FIG. 4 is a cross-section taken along lines 2—2 of FIG. 1, with the cover removed, schematically illustrating a second embodiment of the invention; and FIG. 5 is a cross-section taken along lines 2—2 of FIG. 1, with the cover removed, schematically illustrating furhter embodiments of the invention.

DESCRIPTION OF THE PREFERRED EMBODIMENTS

With reference to FIG. 1, it will be seen that the indicator of the present invention may be very compactly housed. This is of particular significance in connection with applications where space is an important factor. One specific model of the invention is housed in a cover 11 that is 1.000 inch x 0.375 inch x 0.200 inch in size. As viewed in FIG. 1, the indicator mechanism 10 is enclosed within cover 11, and the rotatable permanent magnet structure 12 projects from one end of the cover. Electrical connections are made via leads 13 to the coils of the indicator.

FIG. 2 illustrates the components of the indicator mechanism with the cover 11 removed. The rotatable armature 12 is mounted upon an axis 19 and is freely rotatable. The axis 19 is supported on suitable bearings on member 18 in a position between the extending legs 16, 17 of a magnetizable material.

Member 18 may be fabricated from a single sheet of non-magnetic material bent to provide parallel projecting arms 27, 28. The base portion 29 of the member 18 extends upward and downward, as viewed in the figures, by a sufficient amount to permit binding together the various elements making up the basic structure of the indicator. Legs 16 and 17 are preferably constructed of a soft iron or similar material which retains residual magnetism after external electrical stimulation is removed. Individual coils 24 and 25 are mounted upon cores 21 and 22, respectively, and these cores are secured to legs 16 and 17, respectively. Member 23 completes the magnetic path by extending from leg 16 to leg 17 and thereby creates a substantially U-shaped core. Cores 21 and 22 and member 23 may be soft iron or similar material.

Member 18 is formed of reasonably rigid material and therefore can serve as a basic element for mounting and alignment of the other elements. Cores 21 and 22 are in the form of rods or pins having ends of reduced diameter. Legs 16 and 17 and the base portion 29 of member 18 have holes therein positioned for alignment, and one end of each core projects through these holes. The projecting end may be peened over to secure it in position. The other ends of cores 21 and 22 project through holes in member 23 and may be similarly peened over. This construction yields a rigid and well aligned structure.

Rotatable armature 12 is in fact a permanent magnet having poles disposed 180° apart. In order to provide a discrete indication of the position of this magnet, a dividing line may be established along the axis of the poles and one side 14 may be provided with a distinct coloration relative to the other side 15. If the application of the indicator requires the edge of the armature to be viewed, the distinctive coloration is carried across this area.

Coils 24 and 25 may be wired for individual energization or they may be wired in series in order to provide additive magnetization of the substantially U-shaped core. The particular wiring employed depends upon the particular embodiment of the invention being used.

An understanding of the functioning of the embodiment of the invention shown in FIG. 2 may be more clearly obtained by the consideration of the partial schematic views of FIGS. 3A, 3B and 3C. FIG. 3A illustrates the condition of the armature 12 immediately after energization of the indicator. It is assumed that the upper coil 24 only has just been energized, creating a north pole at the upper leg 16 of the core. In view of the magnetic circuit, this creates an opposing magnetic south pole at the lower leg 17. In view of the proximity of coil 24 to the upper leg 16, the upper pole will be strongest and due to repulsive force between the north pole of the armature and the north pole of leg 16, the armature will be forced to begin counter-clockwise rotation as shown in FIG. 3B. Inertia of the armature 12 is effective to carry it through the 90° position and thereafter the south pole at lower leg 17 and the north pole at upper leg 16 are effective to attract the opposite poles of the armature 12 and magnetically latch them into the position shown in FIG. 3C. Since there are no stop elements, there is no shock connected with the establishment of stable position. Although the indicator is firmly held in position, it is held "softly" and vibration of the equipment will cause very little friction or wear.

When it is desired to change the indicated condition, it is simply necessary to energize the lower coil 25 to establish a north pole at leg 17. Alternatively, a direct current of opposite polarity from the first current applied, could be applied to upper coil 24 and similar results would be effected. During this reset operation, the direction of rotation of armature 12 is determined by the particular coil energized. In each case, the armature will rotate away from the leg associated with the energized coil.

A second embodiment of the invention is disclosed in FIG. 4. It is contemplated that the device illustrated in this embodiment has coils 24 and 25 electrically connected in series to produce an additive magnetic field. As explained above, with coils thus connected, equal and opposite magnetic fields are normally simultaneously developed at legs 16 and 17. Since these fields act directly in opposition to each other, there would normally be no torque developed to rotate armature 12. In the embodiment of FIG. 4, means are provided to retard the magnetic flux in one of the legs so that initially the magnetic field in the other leg is dominant. Thus, a conductive nonmagnetic ring 26 of copper or similar material is inserted between coil 24 and its adjacent leg 16. As a result of the presence of this ring 26, when a direct current is applied to the coils, the magnetic field at the end of leg 17 increases more quickly than that at leg 16. As soon as the field begins to build up with a polarity opposing the present position of the armature 12, the opposing poles on the bottom of the indicator stimulate rotation in a clockwise direction. Once rotation has begun, it will continue for 180° until the indicator is again magnetically latched in position indicative of the polarity of the last control signal. To reverse the indicator position, the opposite polarity direct current may be applied to the series connected coils 24, 25.

Another means for initially creating an unequal distribution of magnetic field strength at legs 16 and 17 is to provide for unequal length of these legs. This is illustrated in FIG. 5. Where the legs are of unequal length the leg that is longest will create the largest flux density and, accordingly, will provide the unbalance required to initiate rotation of armature 12. Where the leg 17 is elongated, as shown in FIG. 5, the rotation will be in a clockwise direction. As in the case of the embodiment of FIG. 4, the coils in this embodiment may preferably be serially connected.

FIG. 5 also shows the inclusion of a ring of nonmagnetic conductive material 26 adjacent the upper leg 16. This inclusion operates cumulatively with the elongated leg 17 to enhance the initially unbalanced torque applied to the armature 12. It should be understood that any of the described techniques for developing unequal magnetic flux densities at the gaps between the legs 16, 17 and the armature 12, may be employed, individually or in combination. It should also be appreciated that the particular electrical connections to energize the coils may be varied in accordance with control signals to be employed and the type of indication desired.

A number of specific embodiments of the invention have been shown and described. It is the intent of the applicant to encompass all aspects of the invention within the skill of those in the art and within the spirit and teaching of the invention as defined in the following claims.

I claim:

1. An indicator mechanism responsive to direct current, comprising in combination a substantially U-shaped core having two projecting legs, a permanent magnet armature rotatable in a plane containing the legs of said core about an axis between said legs, and control means for electromagnetically producing a magnetic flux of opposite polarity and unequal density in each of said legs which co-acts with the magnetic field of the armature to effect rotation of said armature.

2. An indicator mechanism according to claim 1 wherein said armature is free to rotate 360° in either direction.

3. An indicator mechanism responsive to direct current, comprising a substantially U-shaped core, a permanent magnet armature rotatable in a plane containing the legs of said core about an axis between said legs, and individual coils mounted on each of the legs of said substantially U-shaped core for electromagnetically producing a magnetic flux of opposite polarity and unequal density in said legs which co-acts with the magnetic field of the armature to effect rotation of said armature.

4. An indicator mechanism according to claim 3 wherein said coils are separately energizable by direct current to produce a magnetic flux in said substantially U-shaped core which exhibits maximum density at the gap between said armature and the leg upon which the energized coil is mounted.

5. An indicator mechanism according to claim 3, wherein one of said coils is separated from the extended end of the leg upon which it is mounted by a non-magnetic ring of conductive material.

6. An indicator mechanism according to claim 3 wherein one leg of said substantially U-shaped core is longer than the other leg, said longer leg providing a path of lower magnetic reluctance between it and the armature than the magnetic reluctance of the corresponding path between the shorter leg and the armature.

7. An indicator mechanism according to claim 6, wherein the coil mounted upon said shorter leg is separated from the extended end thereof by a non-magnetic ring of conductive material.

8. An indicator mechanism as defined in claim 3, wherein each leg of said U-shaped core comprises an elongated coil mounting portion and a pole face portion, the pole face portion having an elongated pole tip section and a perpendicularly extending mounting section; and wherein said armature is mounted upon an axis supported between parallel extending arms of a non-magnetic frame member, said frame member having a base portion connecting the extending arms and lying in a plane orthogonal thereto; and wherein each said coil mounting section is secured to said base portion and said mounting section with the major axis thereof substantially parallel to the major axis of said pole tip section.

9. An indicator mechanism according to claim 1, wherein said armature rotates more than 90° each time said magnetic flux is produced.

10. An indicator mechanism according to claim 9, including means whereby said armature is magnetically retained in the position assumed as a result of the last most recent production of magnetic flux.

11. An indicator mechanism according to claim 10, wherein said position is retained due to residual magnetism in said legs.

References Cited
UNITED STATES PATENTS

Re. 24,943   2/1961   Skrobisch _____ 335—272 X
3,406,388   10/1968   Pihl _____ 340—373

GEORGE HARRIS, Primary Examiner

U.S. Cl. X.R.
340—373